July 1, 1969 D. W. ROPER 3,452,619

DIFFERENTIAL MECHANISM

Filed Jan. 10, 1968

INVENTOR.
DANIEL W. ROPER
BY
Yount, Flynn & Tarolli
ATTORNEYS

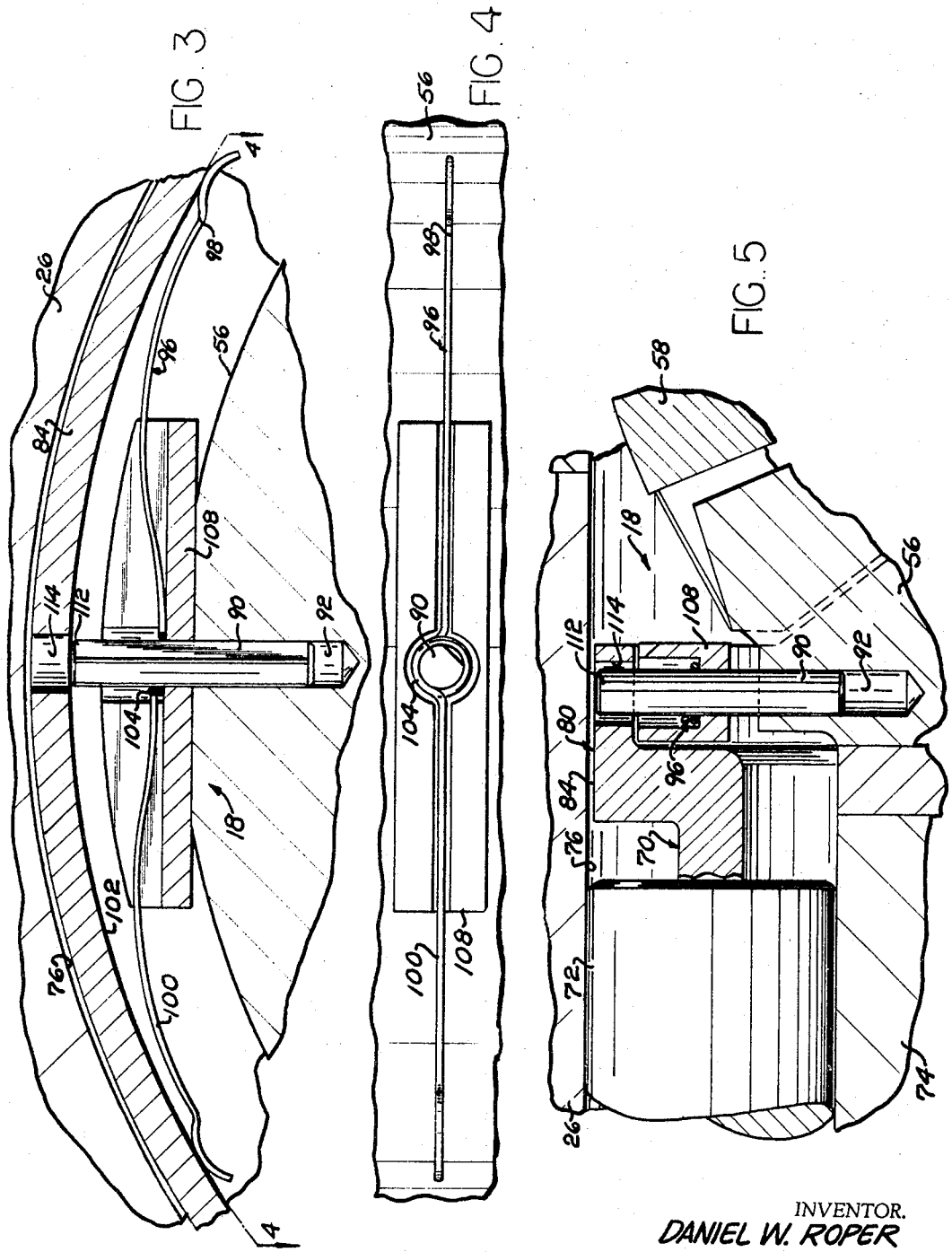

United States Patent Office 3,452,619
Patented July 1, 1969

3,452,619
DIFFERENTIAL MECHANISM
Daniel W. Roper, Rochester, Mich., assignor to Eaton Yale & Towne Inc., Cleveland, Ohio, a corporation of Ohio
Filed Jan. 10, 1968, Ser. No. 696,797
Int. Cl. F16h *1/44*
U.S. Cl. 74—711                                   15 Claims

ABSTRACT OF THE DISCLOSURE

This disclosure relates to a drive mechanism including a drive member, a driven member, a clutch assembly for drivingly connecting the drive and driven members, and an actuator for the clutch assembly. The clutch assembly is operable by the actuator between a first condition wherein the members are rotatable relative to each other and a second condition wherein relative rotation between the members is retarded by the clutch assembly. A lock assembly is operable to lock the clutch assembly against operation to the second condition when one of the members with which the lock assembly rotates is rotating at a speed above a predetermined speed.

---

The present invention relates generally to a drive mechanism, and more particularly to a limited slip differential drive mechanism having clutch means to drivingly connect driving and driven members of the differential mechanism at a predetermined speed of relative rotation therebetween. In accordance with the present invention a lock assembly is provided for locking the clutch means in an inoperative condition when one of the members with which the lock assembly rotates is rotating at a speed above a predetermined speed.

A known limited slip differential includes driving and driven members and a clutch means which is actuated to drivingly connect the driving and driven members in response to a predetermined amount of relative rotation between the driving and driven members. In such known differentials, the clutch means specifically drivingly connects the differential carrier with a side gear of the differential. When one wheel of the vehicle encounters icy conditions, the differential operates to directly drive the other wheel of the vehicle due to the operation of the clutch.

The operation of such limited slip differentials during high vehicle speeds may result in the driver of the vehicle losing steering control of the vehicle and may result in swerving of the vehicle. This problem centers around the fact that at high speeds if one of the wheels of the vehicle encounters slippery conditions, the clutch will be engaged to drivingly connect the differential carrier and the side gear to positively drive the wheel which is not encountering the slippery conditions. This may result in a loss of directional stability or swerving of the vehicle due to the sudden engagement of the clutch and the high speed of the vehicle.

Accordingly, it is the principal object of the present invention to provide a new and improved limited slip differential which is constructed so as to prevent engagement of the clutch, which drivingly connects the driving and driven members, at high vehicle speeds.

It is a further object of this invention to provide a new and improved limited slip differential drive mechanism which is operative to enable the wheels of a vehicle to rotate relative to each other up to a predetermined speed of relative rotation to facilitate the turning of a corner by the vehicle, to retard relative rotation of the wheels in excess of the predetermined speed of relative rotation during low speed operation of the vehicle to prevent one wheel from spinning or rotating at a high speed relative to the other wheel when the one wheel is on a slippery surface, and to enable the wheels to rotate relative to each other at speeds in excess of the predetermined speed of relative rotation during high speed operation of the vehicle to reduce the possibility of a loss of directional stability or swerving of the vehicle if the vehicle encounters a slippery surface with one of the wheels.

Another object of this invention is to provide a new and improved limited slip differential drive mechanism having a means for enabling a pair of driven members to be rotated at a high speed of relative rotation when the members are being rotated at a speed in excess of a predetermined speed.

Another object of this invention is to provide a drive mechanism including a driving member, a driven member, a clutch assembly which is operative to drivingly connect the members at a predetermined speed of rotation between the members, and a lock assembly for locking the clutch assembly against operation when at least one of the members is rotating at a predetermined speed to enable the members to rotate relative to each other at a speed in excess of said predetermined speed of relative rotation when the one member is rotating at said predetermined speed.

Another object of this invention is to provide a new and improved drive mechanism, as noted in the previous paragraph, wherein the lock assembly is rotated with the one member and is operated by centrifugal force resulting from the rotation of the lock assembly.

Another object of this invention is to provide a new and improved differential gear assembly including a clutch means for operatively connecting a pair of members when the members are rotating relative to each other and a means for at least partially disabling the clutch means when the speed of rotation of at least one of the members exceeds a predetermined speed whereby the members rotate relative to each other when the one member is rotating at a speed in excess of the predetermined speed.

These and other objects and features of the invention will become more apparent upon a consideration of the following detailed description taken in connection with the accompanying drawings wherein:

FIG. 3 is a fragmentary sectional view, taken along the line 3—3 of FIG. 2, illustrating the structure of a lock assembly for holding a clutch assembly of the differential drive mechanism of FIG. 1 against operation when a driven member is rotated at a speed in excess of a predetermined speed;

FIG. 4 is a sectional view, taken along the line 4—4 of FIG. 3, further illustrating the structure of the lock assembly; and FIG. 5 is a fragmentary sectional view, similar to FIG. 2, illustrating the lock assembly in a locking or operated position, the lock assembly being shown in FIGS. 2 and 3 in a release or initial unoperated position.

Figure 1:
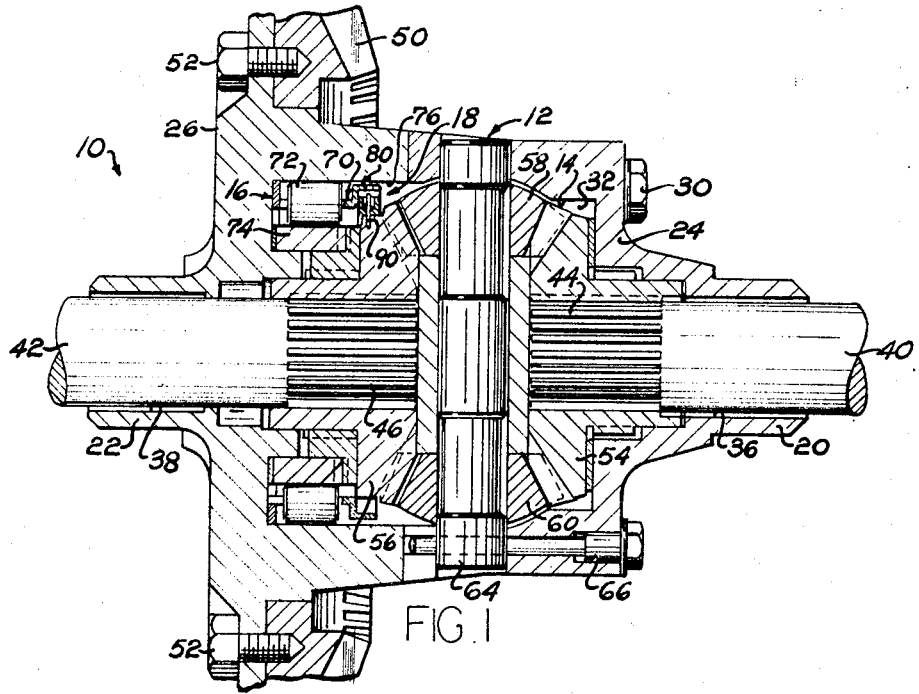
FIG. 1 is a sectional view of a differential mechanism embodying the present invention.

The present invention provides an improved drive mechanism including a clutch assembly for drivingly connecting driving and driven members and which is operated in response to a predetermined speed of relative rotation between the driving and driven members. Operation of the clutch asesmbly drivingly connects the driving and driven members to retard relative rotation between the driving and driven members. An assembly is provided for locking the clutch assembly against operation when a driven member is rotating at a speed above a predetermined speed to thereby prevent operation of the clutch assembly during high speed operation. While the drive mechanism is applicable to different environments, it is particularly adapted for use in a vehicle as a differential. Accordingly, as representative of a preferred embodiment of the present invention the drawings illustrate a differential drive mechanism or assembly 10.

The differential drive assembly 10 is especially suitable for use in driving ground or surface engaging traction wheels of a vehicle. The differential drive assembly 10 includes a rotatable planet gear carrier or casing 12, a differential gear train 14, a clutch assembly 16 operable to retard rotation of one of the gears of the gear train 14 relative to the planet gear carrier 12, and a lock assembly 18 which is operable to lock or hold the clutch assembly 16 against operation.

The planet gear carrier 12 includes a pair of support portions 20 and 22 adapted to be received in bearings of a supporting structure, such as an axle housing, not shown, by which the carrier 12 is rotatably supported. The carrier 12 further includes a pair of members 24, 26 which are integrally formed with the support portions 20, 22, respectively, and are secured together by screws 30 (only one of which is illustrated). The members 24, 26 define a gear chamber 32 in which the gear train 14 and clutch assembly 16 are located. The support portions 20, 22 are provided with axial openings 36, 38 which communicate with the chamber 32 and receive or accommodate driven or power output means as represented by axle shafts 40, 42, respectively, whose outer end portions are connected with traction wheels, or the like, not shown, and whose inner, or adjacent end portions are connected with the gear train 14 by splines 44, 46 which are formed on the end of the shafts 40, 42.

The differential drive assembly 10 includes a ring gear 50 extending around and mounted on the carrier 12 by means of connecting screws 52 which extend through a flange portion of the planet carrier 12. A suitable drive pinion, not shown, meshes with the ring gear 50 and represents the power input means for the differential drive assembly or mechanism 10 and upon rotation effects rotation of the ring gear 50 to rotate the planet carrier 12.

The gear train 14 is operable to transmit the rotary motion of the planet carrier 12 to the output shafts 40, 42. The gear train 14 comprises a pair of bevel side gears 54, 56 and a group of bevel pinion planetary gears 58, 60 disposed between and meshed in engagement with the side gears 54, 56 for drivingly connecting the latter. The planetary gears 58, 60 are rotatably supported by the carrier 14 by means of a pinion shaft 64 extending across the gear chamber 32 and secured to the carrier 12 by an anchor pin 66.

The side gears 54, 56 and pinion gears 58, 60 are, in the preferred embodiment, all bevel gears of conventional form as far as the teeth thereof are concerned, and the tooth profiles are of a conventional shape having pressure angle values coming within the usual range of such values. The side gears 54, 56 are provided with splines which mesh with splines 44, 46 on the shafts 40, 42 to drivingly connect the side gears 54, 56 to the shafts 40, 42, respectively.

The clutch assembly 16 is a double overrunning clutch operable to retard relative rotation between the side gear 56 and the planet carrier 12 and, more specifically, the clutch assembly 16 drivingly locks or interconnects the planet carrier 12 and the side gear 56. The clutch assembly 16 is positioned between the planet carrier 12 and the side gear 56 and includes a shiftable roller cage or frame 70, and a plurality of rollers 72, supported in openings in the shiftable roller cage 70. The openings are dimensioned so as to permit the rollers 72 to be freely rotatable and radially shiftable relative to the cage 70 and, yet, prevent circumferential movement of the rollers relative thereto.

The roller cage 70 is shiftable or movable to a position wherein the rollers 72 are wedgingly engaged between surfaces formed on an annular member 74 and a cylindrical surface 76 forming the inner periphery of the carrier 12. The annular member 74 is drivingly connected to the side gear 56 so that the wedging of the rollers drivingly connects the carrier 12 and the side gear 56 together. This operation of the clutch assembly locks up the differential gear assembly 10 in a manner which is described in detail in copending application Ser. No. 637,112, entitled Differential Mechanism and filed by Roper et al. on May 9, 1967 and assigned to the same assignee as is the present invention. Of course, clutch assemblies other than the specific illustrated embodiment could be used in the differential assembly 10.

The clutch assembly 16 is associated with an actuator assembly or means 80 (see FIG. 2) for moving the rollers 72 to their engaged positions between the surfaces on the member 74 and the surface 76 of the carrier 12 in response to a predetermined speed of relative rotation between the carrier 12 and the side gear 56. The actuator assembly 80, in the present embodiment of the invention, is a viscous coupling comprising an annular flange portion 84 of the roller cage 70. The annular flange portion 84 extends generally axially of the side gear 56 and away from the rollers 72. The flange portion 84 has an annular outer peripheral surface 86 which lies adjacent to the similar annular surface 76 formed on the interior of the casing or planet carrier 12. The surfaces 76 and 86 form a viscous shear space therebetween in which a viscous shear fluid is located and which functions as a drive connection between the carrier 12 and the cage 70.

Upon a predetermined speed of relative rotation between the planet carrier 12 and the side gear 56, the driving force provided by the shear fluid of the viscous coupling forming the actuator assembly 80 effects a circumferential movement of the cage 70 relative to the side gear 56 so that the clutch assembly 16 drivingly connects the carrier 12 and side gear 56. Thus, the actuator assembly 80 is operated in response to a predetermined rate of rotation between the side gear 56 and the carrier 12 to operatively connect the side gear and carrier 12. It will be apparent to those skilled in the art that an actuator assembly, other than the specific one illustrated could be used for operating the clutch assembly.

When the clutch assembly 16 has been operated by the actuator assembly 80, the side gear 54 is drivingly connected with the side gear 56 through the planetary gears 58, 60, the carrier 12 and the clutch assembly 16. Of course, the ring gear 50 is connected to both of the side gears 54, 56. When the clutch assembly 16 is in a normal or release position, the differential drive train 14 functions in a well known manner to enable the shafts 40, 42 to be rotated relative to each other. As the speed of relative rotation between the shafts 40, 42 increases, the speed of relative rotation between the carrier 12 and side gear 56 increases to operate the actuator assembly 80 at a predetermined speed of relative rotation between the shafts 40, 42 to drivingly connect the shafts. When the clutch assembly 16 has been operated to drivingly connect the shafts 40, 42, relative rotation between the shafts is retarded by the clutch assembly. Thus, the clutch assembly 16 interacts with the gear train 14 to provide what is commonly called a limited slip differential mechanism.

Figure 2:
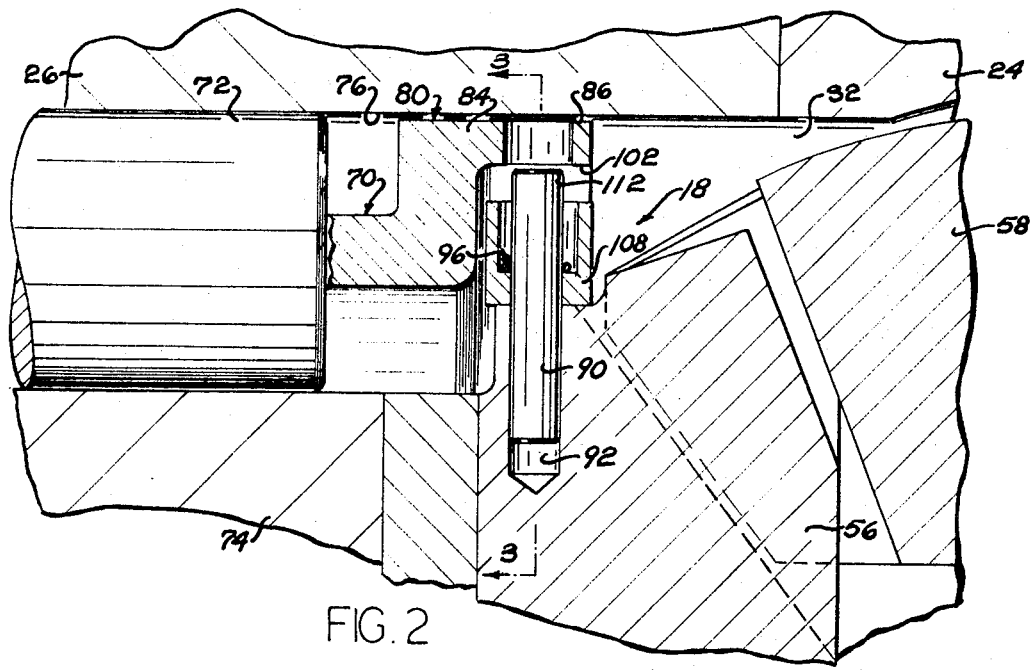
FIG. 2 is a fragmentary sectional view, on an enlarged scale, of a portion of the differential mechanism of FIG. 1.

In accordance with the present invention, the lock assembly 18 is provided for locking the clutch assembly against operation to an engaged position when the shaft 42 and side gear 56 are rotating at a speed above a predetermined speed. Thus, when the shaft 42 is rotating above the predetermined speed and the lock assembly 18 is operated to a locking condition, the clutch assembly 16 is disabled or rendered ineffective so that the shafts 40, 42 are free to rotate relative to each other. To this end, the lock assembly 18 includes a pin or lock element 90 (see FIGS. 2, 3 and 4) which, in the preferred embodiment, is slidably mounted in a hole or recess 92 in the side gear 56. The pin 90 is urged toward the release or initial unoperated position, as shown in FIGS. 2 and 3, by a resilient biasing spring 96 having leg portions 98 and 100 which engage a radially inner surface 102 of the roller cage flange portion 84. The spring 96 also includes a body section 104 which circumscribes the pin 90 and engages a transversely extending stop member 108 which is fixedly connected to the pin 90. The leg portions 98, 100 of the spring 96 press downwardly against the stop member 108 to hold the pin 90 in the release position of FIG. 3.

In the illustrated embodiment, the lock assembly 18 is actuated to a locking or operated position by centrifugal force resulting from the rotation of shaft 42 at a predetermined speed or rate. Accordingly, the pin 90 is slidably received within the recess 92 and is moved radially outwardly relative to both the side gear 56 and the shaft 42 against the urging of the spring 96 by centrifugal force resulting from a rotation of the lock assembly 18 with the side gear 56 and shaft 42. As the speed of rotation of the side gear 56 and shaft 42 increases, the centrifugal force on the lock assembly 18 is correspondingly increased. When the centrifugal force is sufficient to overcome the urging of the spring 96, the pin 90 is moved outwardly from the release position of FIG. 3 to the locking or operated position of FIG. 5. This outward movement of the pin 90 is limited by engagement of the stop member 108 with the inner surface 102 of the flange portion 84 of the roller cage 70. Of course, the lock assembly 18 could be constructed with a speed responsive locking member mounted in a location other than on a side gear.

When the pin 90 is in the locking or operated position of FIG. 5, a radially outer end portion 112 of the pin 90 is received in a hole or aperture 114 formed in the flange section 84 of the roller cage 70. The roller cage 70 is then held against rotation relative to both the side gear 56 and the annular member 74 so that the rollers 72 cannot be brought into wedging engagement with the radially inner surface of the member 74 and the surface 76 of the carrier 12. Thus, the pin 90 of the lock assembly 18 is moved outwardly by centrifugal force when the side gear 56 and the shaft 42 are rotated at a speed in excess of a predetermined speed at which the centrifugal force acting on the pin member 90 and stop member 108 is sufficient to overcome the inward force or urging of the spring 96. Of course, the speed of rotation at which the pin 90 moves from the release position of FIG. 3 to the locking position of FIG. 5 can be varied or adjusted by changing the force exerted against the stop member 108 by the spring 96 or by varying the weight of the pin 90 and or member 108.

It is contemplated that the speed-responsive lock assembly 18 will be used in connection with mechanisms other than the differential drive assembly 10. However, the differential drive assembly 10, with the lock assembly 18, is particularly well adapted for use in an automobile or similar vehicle. When the differential drive assembly 10 is installed in an automobile, the driven power output shafts 40, 42 are connected to the wheels of the vehicle in a well-known manner and the ring gear 50 is engaged by a pinion driven by the engine of the vehicle. The driven ring gear 50 then transmits drive forces to the differential drive train 14 through the carrier 12.

At relatively low speeds of vehicle operation, the differential drive train 14 divides the drive forces equally between the driven power output shafts 40, 42 and enables the shafts to rotate relative to each other. This well known differential action continues until one of the shafts is rotated relative to the other shaft with sufficient speed to operate the clutch assembly 16. When this predetermined speed of realtive rotation is present between the shafts 40, 42 there will be sufficient relatives rotation between the carrier 12 and the flange 84 to operate the actuator assembly 80 and thereby move the clutch assembly 16 to the operated condition wherein the side gear 56 is operatively connected to the carrier 12 and side gear 54 to interconnect the driven shafts 40, 42. The clutch assembly 16 then retards the relative rotation between the driven shafts 40, 42 to reduce the speed of relative rotation between the shafts, in a manner disclosed more fully in the aforementioned application Ser. No. 637,112. This action of the clutch assembly 16 results in the drive forces being divided unequally between the shafts 40, 42. Therefore, if one wheel of the vehicle is in engagement with an icy or a slippery surface, the other wheel of the vehicle is positively rotated to move the vehicle relative to the surface. Thus, the clutch assembly 16 is operated when a predetermined speed of relative rotation is present between the wheels of a vehicle to interconnect or lock the wheels, as is commonly done with limited slip differential assemblies, to prevent the vehicle from becoming stuck due to spinning of one wheel while the other wheel remains motionless relative to the support surface.

During high speed operation of a vehicle, the speed-responsive lock assembly 18 is rotated with the shafts 40, 42 so that centrifugal force moves the pin member 90 into engagement with the aperture 114 in the roller cage or frame 70 (as shown in FIG. 5). The roller cage 70 is then held against movement relative to the carrier 12 so that the clutch assembly 16 cannot be moved to the operated position, in the manner previously described, when the aforementioned predetermined speed of relative rotation occurs between the shafts 40, 42. Thus the lock assembly 18 is operated by centrifugal force at a speed above or in excess of a predetermined speed of rotation of the side gear 56 and shaft 42 to lock the clutch assembly 16 in the unoperated condition. When the clutch assembly is so locked, the differential drive train 14 divides the forces equally between the drive shafts 40 and 42 and permits the shafts 40, 42 to rotate at high speeds relative to each other. If one of the wheels of the vehicle engages a patch of ice when the vehicle is being driven at a relatively high speed with the lock assembly 18 in the operated position, the drive forces will be divided equally between the wheels of the vehicle by the well known action of the differential drive train 14. This equal division of the driving forces results in the wheel on the slippery or icy surface being rotated at a relatively high rate relative to the other driving wheel. The vehicle then moves forwardly without a loss of directional stability due to the continued equality of driving action provided by the two wheels.

If the lock assembly 18 was omitted, as in heretofore known differential drive assemblies, the clutch assembly 16 would be moved to the operated condition during high speed operation of the vehicle when one of the wheels engages a slippery or icy surface and a predetermined speed of relative rotation is present between the wheels. Movement of the clutch assembly 16 to the operated condition interconnects the drive wheels of the vehicle to directly drive the wheel of the vehicle having the greatest degree of traction. The resulting unequal division of the driving forces may then cause the vehicle to lose its directional stability by swerving or moving sidewardly in the direction of the wheel engaging the slippery surface. Thus it can be seen that the lock assembly 18 is provided to lock out the action of the clutch assembly 16 during high speed operation of the vehicle to thereby reduce the possibility of swerving or loss of directional stability at high speeds when one of the wheels of the vehicle encounters a slippery surface.

When the speed of the vehicle is reduced, the rotation of the side gear 56 and the centrifugal force acting on the lock assembly 18 is correspondingly reduced. As the centrifugal force acting on the lock assembly 18 is reduced, the spring 96 moves the lock assembly back to the normal or unoperated position of FIGS. 2 and 3. The clutch assembly 16 is then freed or released for movement to the operated position under the influence of the actuator assembly 80 when a predetermined speed of relative rotation is present between the shafts 40, 42.

Although a specific embodiment of the invention is illustrated and described herein, it is contemplated that many changes will be made by those skilled in the art. By way of an example, it is contemplated that the lock assembly could be used with a clutch assembly other than the specific one shown and could be mounted for rotation with a part of the differential assembly other than the side gear. It is also contemplated that the lock assembly could, if desired, be made responsive to means other than centrifugal force. Thus, while a single embodiment of the invention has been illustrated, the present invention is not to be considered as limited to the precise construction shown. It is my intention to cover hereby all adaptations, modifications, and uses of the present invention which come within the scope of the appended claims.

What is claimed is:

1. A drive mechanism including a driving member and a driven member, clutch means located between said members and operable between a first condition wherein said members are capable of rotating relative to each other and a second condition wherein relative rotation between said members is retarded by said clutch means, actuator means for operating said clutch means to said second condition in response to a predetermined speed of relative rotation between said members, and means for locking said clutch means in said first condition when at least one of said members is rotating at a speed above a predetermined speed, said actuator means being ineffective for operating said clutch means to said second condition in response to said predetermined speed of relative rotation between said members when said clutch means is locked in said first condition.

2. A drive mechanism as set forth in claim 1 wherein said means for locking said clutch means in said first condition includes an element mounted for movement from a first position to a second position retaining said clutch means against operation to said second condition, said element being moved from said first position to said second position in response to centrifugal force acting on said element when said one member is rotating at a speed above said predetermined speed.

3. A drive mechanism as set forth in claim 1 wherein said means for locking said clutch means in said first condition includes an element mounted for movement from a first position to a second position retaining said clutch means against operation to said second condition and a resilient means for urging said element toward said first position, said element being moved from said first position to said second position against the urging of said resilient means by centrifugal force acting on said element when said one member is rotating at a speed above said predetermined speed.

4. A drive mechanism as set forth in claim 1 wherein said driving member comprises a carrier of a differential gear assembly and said driven member comprises a side gear of said differential gear assembly and said means for locking said clutch means in said first condition is mounted for rotation with said side gear of said differential gear assembly and is moved relative to said side gear by centrifugal force when the speed of rotation of said side gear exceeds said predetermined speed of rotation.

5. A drive mechanism as set forth in claim 1 wherein said clutch means includes a plurality of rollers mounted on a carrier, said carrier being moved relative to one of said members by said actuating means to wedgingly engage said rollers between said members to thereby operate said clutch means from said first condition to said second condition, said carrier being held against movement relative to one of said members by said means for locking said clutch means in said first condtion when the speed of rotation of said one member exceeds said predetermined speed of rotation.

6. A drive assembly comprising input means for connecting said drive assembly to a source of power, a pair of members operatively associated with said input means, gear means operatively associated with said input means for enabling said members to rotate at different speeds under the influence of drive forces transmitted to said members from said input means, a clutch assembly associated with said members and operable between a first condition wherein said members are rotatable relative to each other and said drive forces from said input means are divided equally between said members by said gear means and a second condition wherein said members are operatively connected by said clutch assembly to retard relative rotation between said members and to divide drive forces from said input means unequally between said members, in actuator associated with said clutch assembly for operating said clutch assembly to said second condition in response to a predetermined speed of relative rotation between said members, and a lock assembly for holding said clutch assembly in said first condition at speeds in excess of a predetermined speed of rotation of one of said members, said actuator being ineffective for operating said clutch assembly to said second condition in response to said predetermined speed of relative rotation between said members when said clutch assembly is held in said first condition by said lock assembly.

7. A drive assembly as set forth in claim 6 wherein said input means includes a ring gear mounted on a carrier and said gear means is located within said carrier, said differential gear assembly including a pair of side gears, each of which is connected to one of said members, and a pair of planetary gears mounted in meshing engagement with said side gears, said members and side gears being rotatable relative to said carrier and ring gear, said planetary gears being rotatable relative to said side gears on an axis of rotation which is fixed relative to said carrier and ring gear, said actuator being responsive to relative rotation between said carrier and said one of said members to operate said clutch assembly to said second condition to retard rotation between said members and said carrier when the speed of relative rotation between said members exceeds said predetermined speed of relative rotation, and wherein said lock assembly is mounted for rotation with said one member and is operable in response to centrifugal force resulting from said rotation of said lock assembly to hold said clutch means in said first condition when at least said one of said members is rotating at a speed in excess of said predetermined speed to thereby prevent said clutch assembly from operatively connecting said members to retard relative rotation between said members and said carrier when the speed of rotation of said one member is in excess of said predetermined speed of rotation.

8. A drive assembly as set forth in claim 7 wherein said clutch assembly includes a plurality of rollers mounted on a frame, said actuator includes a surface separated from a surface of said carrier by a space filled with a viscous fluid which transmits forces to move said frame and rollers relative to said one member when said predetermined speed of relative rotation is present between said members, said rollers being moved into engagement with a surface of said carrier and a surface rotating with said one member by said movement of said frame and rollers relative to said one member to thereby operate said clutch assembly from said first condition to said second condition, and wherein said lock assembly includes an element movable in response to centrifugal force for holding said frame against movement relative to said one member when the speed of rotation of said one member is in excess of said predetermined speed of rotation.

9. A drive assembly as set forth in claim 8 wherein said lock assembly includes a spring for resiliently holding said element against movement under the influence of centrifugal force, said element being movable against the urging of said spring under the influence of centrifugal force from a position spaced apart from said frame to a position engaging said frame to thereby hold said frame against movement relative to said one member.

10. A drive assembly as set forth in claim 8 wherein said element is slidably mounted in the side gear connected to said one member and said element is moved outwardly from said side gear to engage said frame when the speed of rotation of said one member exceeds said predetermined speed of rotation.

11. A drive assembly as set forth in claim 6 wherein said lock assembly is rotatable with said one member and includes an element mounted for movement under the influence of centrifugal force resulting from the rotation of said lock assembly to operatively interconnect said clutch assembly and said one member to lock said clutch assembly against operation from said first condition to said second condition.

12. A differential gear assembly for transmitting drive forces from a source of power to a pair of members, said differential gear assembly comprising differential gearing for enabling one member to rotate faster than the other, clutch means associated with said differential gearing for drivingly connecting said members when said members are rotating relative to each other at a speed in excess of a predetermined speed of relative rotation to thereby retard relative rotation between said members, and means operatively associated with said clutch means for at least partially disabling said clutch means when the speed of rotation of at least one of said members exceeds a predetermined speed to enable said members to rotate relative to each other at a speed in excess of said predetermined speed of realtive rotation.

13. A differential gear assembly as set forth in claim 12 wherein said means for at least patrially disabling said clutch means is mounted for rotation with a first one of said members and is operated in response to centrifugal force resulting from said rotation with said first member when the speed of rotation of said first member exceeds said predetermined speed of rotation.

14. A differential gear assembly as set forth in claim 12 wherein said means for at least partially disabling said clutch means includes an element which locks said clutch means against oepration to a condition in which said clutch means operatively connects said members.

15. A differential gear assembly as set forth in claim 14 wherein said element is mounted for rotation with a first one of said members and is moved outwardly relative to said first member by centrifugal force resulting from said rotation with said first member to lock said clutch means against operation.

References Cited

UNITED STATES PATENTS

| | | | |
|---|---|---|---|
| 3,324,744 | 6/1967 | Roper | 74—711 |
| 3,392,601 | 7/1968 | Roper | 74—711 |

ARTHUR T. McKEON, *Primary Examiner.*

U.S. Cl. X.R.

192—104

UNITED STATES PATENT OFFICE
CERTIFICATE OF CORRECTION

Patent No. 3,452,619                        July 1, 1969

Daniel W. Roper

It is certified that error appears in the above identified patent and that said Letters Patent are hereby corrected as shown below:

Column 8, line 18, "in" should read -- an --; line 32, "differential gear assembly" should read -- gear means --.

Signed and sealed this 7th day of April 1970.

(SEAL)
Attest:

Edward M. Fletcher, Jr.                     WILLIAM E. SCHUYLER, JR.
Attesting Officer                            Commissioner of Patents